United States Patent [19]

Shim

[11] 3,742,058
[45] June 26, 1973

[54] POLYMERIC TERTIARY ALKYLAMINE VULCANIZING AGENTS AND METHOD OF PREPARATION

[75] Inventor: Kyung S. Shim, Irvington, N.Y.

[73] Assignee: Stauffer Chemical Company, New York, N.Y.

[22] Filed: Aug. 2, 1971

[21] Appl. No.: 168,427

Related U.S. Application Data

[63] Continuation-in-part of Ser. No. 153,833, June 16, 1971, which is a continuation-in-part of Ser. No. 839,615, July 7, 1969, abandoned, which is a continuation-in-part of Ser. No. 831,722, June 9, 1969, abandoned.

[52] U.S. Cl........ 260/583 EE, 260/23.7 M, 260/79, 260/79.5 B, 260/79.5 C, 260/775, 260/785
[51] Int. Cl. ... C08f 27/06, C07c 85/00, C07c 85/04
[58] Field of Search................. 260/79, 79.5 B, 795, 260/798, 583 EE

[56] References Cited
UNITED STATES PATENTS

| | | | |
|---|---|---|---|
| 2,649,470 | 8/1953 | Harman | 260/464 |
| 3,040,098 | 6/1962 | Stone | 260/583 EE |
| 3,595,919 | 7/1971 | Shim | 260/583 EE |

*Primary Examiner*—Joseph L. Schofer
*Assistant Examiner*—C. A. Henderson, Jr.
*Attorney*—Wayne C. Jaeschke, Martin Goldwasser et al.

[57] ABSTRACT

Poly(tertiary alkylamine) sulfide compositions useful as vulcanizing agents for synthetic and natural rubbers, the repeating structural unit of these compositions having the following formula:

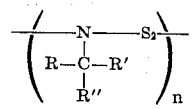

wherein n can range between 3 and 100, R, R' and R'' are $C_1$–$C_4$ alkyl groups which can be the same or different with the proviso that the total number of carbon atoms in sum of R+R'+R'' is from four to 12, as well as a process for manufacturing the same.

1 Claim, No Drawings

POLYMERIC TERTIARY ALKYLAMINE VULCANIZING AGENTS AND METHOD OF PREPARATION

RELATED APPLICATIONS

This application is a continuation-in-part of my copending application Ser. No. 153,833, filed June 16, 1971, which is, in turn, a continuation-in-part of application Ser. No. 839,615, filed July 7, 1969, now abandoned which is, in turn, a continuation-in-part of application Ser. No. 831,722 filed June 9, 1969, now abandoned.

BACKGROUND OF THE INVENTION

In the art of vulcanizing rubber compositions, it is the practice to admix the particular rubber material with additive compounds such as process oils, organic acids and zinc oxide. These rubber materials can be selected from any number of compositions useful in a vulcanizing process such as natural rubber or synthetic unsaturated rubbers. The synthetic unsaturated rubbers can be described as alpha-olefin hydrocarbons which include ethylene propylene/diene terpolymers, ethylene/1-butene/diene terpolymers, styrene/butadiene copolymers, cis-poly-butadiene polymers, isoprene polymers and butadiene/acrylonitrile copolymers. After these materials are thoroughly mixed together, a vulcanizing agent is added thereto and the resulting combination of ingredients is then heated in a conventional apparatus and thereby vulcanized into useful products.

The most commonly used vulcanizing agent for such formulations is free sulfur. However, its use often leads to premature vulcanization, i.e., scorch, during its mixing with the rubber and with other ingredients. Moreover, "blooming" is encountered, whereby crystals of sulfur form on the surface of the uncured rubber, preventing the desired mutual adhesion of rubber sheets such, for example, as tire plies. In order to overcome these problems, amino compositions containing a substantial amount of sulfur have been formulated and used in lieu of free sulfur. However, these materials have not been notably successful because the resulting rubber formulations are often too scorchy, have a high reversion, a low curing rate and poor blooming properties.

The art of manufacturing N,N-polythio dialkyl amines is an old and well known procedure as described, for example, in U.S. Pat. Nos. 1,719,910, 2,284,578 and 2,779,761. This process entails the reaction of a secondary alkyl amine with sulfur monochloride or sulfur dichloride so as to yield a symmetrical composition which is reported to be useful as a curing agent for rubbers. However, polymeric amine sulfides cannot be manufactured by this process since it is not capable of yielding products in which the repeating structural units contain nitrogen-to-sulfur bonds. Thus, by employing the process of the prior art, the repeating structural unit of the resulting compound will contain several sulfur atoms between at least two nitrogen atoms. Moreover, attempts to manufacture polyamine sulfides have not been successful due in part to the relative instability of the end products. However, a procedure which has been successful in preparing these polyamine sulfides is set forth in the above described application Ser. No. 839,615.

By means of this procedure, polyamine sulfides can be manufactured by reacting a primary amine with a sulfur chloride under carefully controlled conditions so as to yield polymeric compositions whose repeating structural units have the formula:

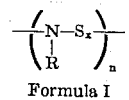

Formula I wherein R is an alkyl group containing from about three to 10 carbon atoms which can be straight chained, branched or cyclic in nature, wherein $x$ can be between 1 and 5 and $n$ can range between 2 and 100.

Subsequent to the filling of the above described application Ser. No. 839,615, it was found that the poly (tertiary butylamine) sulfide compositions whose repeating structural units have the formula:

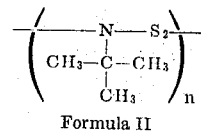

Formula II wherein $n$ can range between 3 and 100 are far superior, as vulcanizing agents, to the other members of the broad class of polyamine sulfides encompassed within the scope of the above given generic formula, i.e., Formula I. Thus, this tertiary butylamine derivative has been found to be far superior, for example, to the n-butyl, isopropyl, ethyl, methyl, n-propyl and cyclohexyl amine derivatives with respect to the improved scorch delay, accelerated cure and low reversions which it achieves upon being used as a vulcanizing agent for natural and synthetic rubbers.

This poly(tertiary butylamine) sulfide was, accordingly, described and claimed in copending application Ser. No. 153,833. Moreover, in the latter application, it was noted that the surprising degree of superiority, as a vulcanizing agent, which is displayed by this tertiary butylamine derivative is believed to be brought about by the steric hindrance resulting from the presence of its tertiary alkyl groups and that other poly (alkylamine) sulfides wherein the alkyl groups are tertiary alkyl groups may provide comparable results, as vulcanizing agents, for the curing of natural and synthetic rubbers.

Technical Disclosure of the Invention

Thus, it has now been found that excellent results are obtained in the vulcanization of natural and synthetic rubber using, as curing agents, the poly(tertiary alkylamine) sulfide compositions whose repeating structural units have the formula:

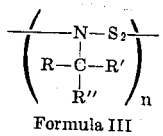

Formula III wherein $n$ can range between about 3 and 100, R, R' and R'' are $C_1$-$C_4$ alkyl groups which can be the same or different with the proviso that the total number of carbon atoms in the sum of R+R'+R'' is from four to 12.

More particularly, these poly(tertiary alkylamine) sulfides provide longer scorch delay periods thereby providing the practitioner with a longer period during which he may safely work the rubber composition without its undergoing crosslinking prior to the vulcanization step. The attainment of an accelerated cure with the novel polymeric derivatives of this invention is also significant in that a faster cure permits a greater volume of rubber to be vulcanized within a given period of time. And, the low degree of reversion, i.e., breakdown of crosslinking, exhibited by the rubber compositions vulcanized with the novel curing agents of this invention is indicative of the excellent heat aging characteristics of these compositions.

In preparing these novel vulcanizing agents, the selected tertiary alkylamine is dissolved within an organic solvent such as hexane, octane, petroleum ether, pentane, heptane, ether, or like organic solvents. The tertiary alkylamine and organic solvent are then cooled to a temperature in the range of from about 0 to about 50° C. Aqueous alkali hydroxide is then introduced so as to form a two-layer system consisting of an organic upper layer whereupon sulfur monochloride, i.e., $S_2Cl_2$, is added dropwise to the organic layer in order to form the desired end product. Suitable tertiary alkylamines include, for example tertiary amylamine, tertiary octylamine, tertiary dodecylamine, tertiary hexylamine, tertiary heptylamine, tertiary nonylamine and tertiary decylamine. The alkali metal hydroxide can be selected from the group consisting of sodium hydroxide and potassium hydroxide.

The mechanism for the reaction is believed to involve a sequence whereby, upon adding the sulfur monochloride to the amine or organic layer, an amine salt, i.e., an amine hydrochloride will form and will precipitate into the aqueous layer. The amine hydrochloride will then react with the alkali in the aqueous layer to free the amine which will then react with the sulfur monochloride within the organic layer to form the desired end product. After the product has been formed, the aqueous layer is simply separated from the organic layer with the end product being washed and purified.

The resulting poly(tertiary alkylamine) sulfide polymeric composition can then be used in vulcanizing various rubber compositions. Thus, it can be intermixed with either natural rubbers or with unsaturated synthetic rubbers in an amount ranging between 0.5 to about 10 parts per 100 parts of the rubber composition. Typical synthetic rubbers include ethylene/propylene/diene terpolymers, ethylene/1-butene/diene terpolymers, styrene/butadiene copolymers, cis-polybutadiene polymers, isoprene polymers, butadiene/acrylonitrile copolymers and the like. After the vulcanizing agent has been added thereto along with other commonly utilized adjuvants such as accelerators, zinc oxide and aliphatic, e.g., stearic, acids, the rubber composition is fully cured in a conventional manner.

The following examples will further illustrate the embodiment of this invention. In these examples, all parts given are by weight unless otherwise noted.

EXAMPLE 1

This example illustrates the preparation of one of the novel poly(tertiary alkylamine) sulfide curing agents of this invention, i.e., poly(tertiary amylamine) sulfide.

In a three-neck round bottom flask equipped with a mechanical stirrer, thermometer and dropping funnel are placed 700 grams of hexane, 90 grams of tertiary amylamine, 2 liters of water and 180 grams of sodium hydroxide. The solution is cooled in an ice-bath to 27° C. As the solution is being stirred vigorously, 610 grams of sulfur monochloride dissolved in 200 milliliters of hexane are added, dropwise, over a period of 1.5 hours while keeping the reaction temperature below 27° C. Upon completion of the addition of the sulfur monochloride, the mixture is stirred for 2 hours in order to complete the reaction whereupon the hexane layer is separated from the colorless aqueous layer and dried over magnesium sulfate. The solvent is then removed on a rotary evaporator to give 580 grams of a yellowish oil having an average molecular weight of about 612.

EXAMPLE 2

This example illustrates the preparation of another of the novel poly(tertiary alkylamine) sulfide curing agents of this invention, i.e., poly(tertiary octylamine) sulfide.

Following the procedure of Example 1, hereinabove, 578 grams of tertiary octylamine is, in this instance, substituted for the 90 grams of tertiary amylamine thereby providing a yield of 745 grams of poly(tertiary octylamine) sulfide which is in the form of a yellowish oil having an average molecular weight of about 715.

EXAMPLE 3

This example describes the use of the poly(tertiary alkylamine) sulfides of this invention, as prepared by the process of Examples 1 and 2, respectively, as curing agents for natural rubber. A master batch is first prepared by mixing 40 parts of carbon black, 4 parts of zinc oxide, 2 parts of stearic acid, 1 part of an antioxidant and 1 part of benzothiazole disulfide with 100 parts of natural rubber. Portions of this master batch are then used to prepare three different stocks. Thus, 2.5 parts of free sulfur are added to the first stock and 2.75 parts of the curing agents of Examples 1 and 2 are added to the second and third stocks respectively. The curing characteristics of the thus prepared stocks are then evaluated with a rotating disc viscometer as well as with an oscillating disc rheograph. By this means, it is found that the novel products of this invention provide results which are superior to those which are obtained with sulfur.

EXAMPLE 4

This example describes the use of the novel poly(tertiary alkylamine) sulfides of this invention, as prepared by the process of Examples 1 and 2, respectively, as curing agents for a commercial styrene/butadiene rubber composition. Thus, 40 parts of carbon black, 16 parts of a naphthenic process oil, 4 parts of zinc oxide, 2 parts of stearic acid, 1 part of an antioxidant and 1.5 parts of mercaptabenzothiazole are blended with 100 parts of styrene/butadiene rubber. Portions of this master batch are then used to prepare three different stocks. Two parts of free sulfur are added to the first stock and 3.5 parts of the curing agents of Examples 1 and 2 are added to the second and third stocks respectively. The curing characteristics of thus prepared stocks are then evaluated with a rotating disc viscometer as well as with an oscillating disc rheograph. By this means, it is found that the novel products of this invention provide results which are superior to those obtained with sulfur.

Variations may be made in proportions, procedures and materials without departing from the scope of this invention as defined in the following claims.

What is claimed is:

1. A poly(tertiary alkylamine) sulfide whose repeating structural unit has the formula:

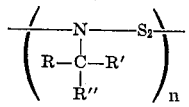

wherein $n$ can range between 3 and 100, R, R' and R'' are $C_1$–$C_4$ alkyl groups which can be the same or different with the proviso that the total number of carbon atoms in the sum of R+R'+R'' is from four to 12.

* * * * *